Aug. 13, 1946.  E. C. SMITH  2,405,764
SECTIONAL THERMOS FOOD CONTAINER
Filed Aug. 22, 1945  2 Sheets-Sheet 1

INVENTOR.
Edgar C. Smith,
BY
Attorney.

Aug. 13, 1946.　　　　E. C. SMITH　　　　2,405,764
SECTIONAL THERMOS FOOD CONTAINER
Filed Aug. 22, 1945　　　2 Sheets-Sheet 2
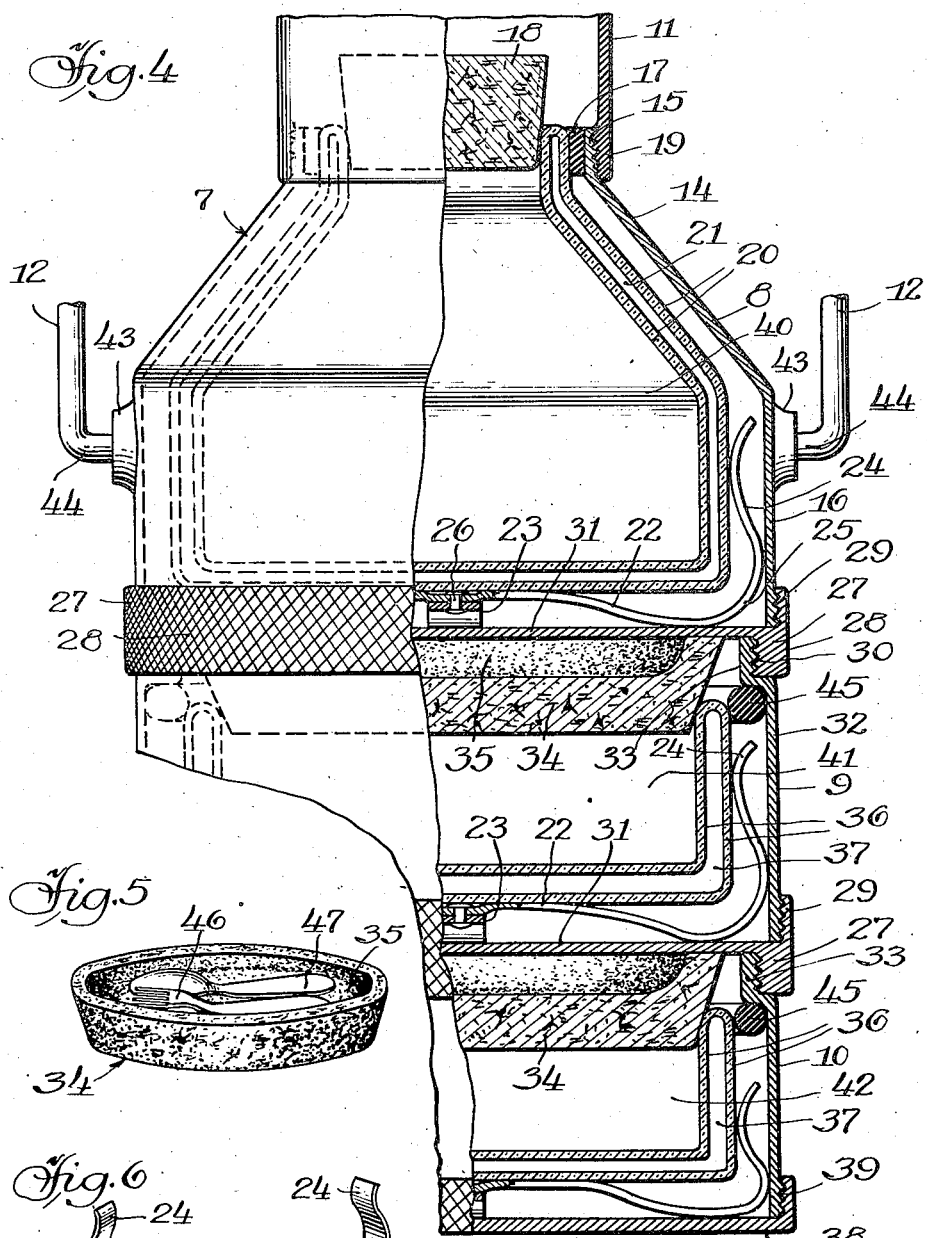

Patented Aug. 13, 1946

2,405,764

UNITED STATES PATENT OFFICE 2,405,764

SECTIONAL THERMOS FOOD CONTAINER

Edgar C. Smith, Chicago, Ill.

Application August 22, 1945, Serial No. 612,093

1 Claim. (Cl. 206—4)

My invention pertains to containers for holding foods and maintaining the said foods, as nearly as possible, in the condition in which they were when originally placed in the container.

One object of my invention is to provide a container of the aforementioned character which will have a series or multiplicity of independent compartments which are equipped with heat conditioning or insulating structural features so as to maintain liquid foods as well as non-liquid edibles in a heated or cold condition depending on the condition of the said foods at the time they are placed within my thermos structure or container.

A further object of my invention is to provide a food container which will maintain a complete lunch in the condition in which it is when originally placed in the container, the said container being provided with a liquid retainer unit which is of thermos structural arrangement and to which may be secured at least one or more intermediate containers for placing non-liquid foods therein, such as meats and vegetables to be preserved in a hot or cold condition, and an end container in which may be placed ice cream or fruits or any foods that are usually considered the dessert course to a meal.

Another important object of my invention is to provide a thermos controlled conditioning container which is capable of holding hot foods or cold foods or a combination of both confining in separate compartments liquid foods and non-liquid foods, the same being compactly arranged and constructed and provided with means for carrying the same about so that it may be used by campers when going on outings, or for storing an individual lunch, or the lunches of more than one individual.

Another object of my invention is to provide a thermos container of the aforementioned character, namely, which is capable of maintaining all the lunch courses in the condition in which it is desired to maintain them, and which can be dismantled or separated into its sub-divided structures and used for actually eating the meal therefrom.

Other objects and advantages resident in my invention will become apparent from an examination of the accompanying drawings, taking into consideration the ensuing description wherein like symbols designate like parts, and in which;

Fig. 4 is an enlarged longitudinal cross-sectional view of my invention with a portion thereof shown in elevation.

Fig. 5 is a perspective view of one of the cork seal elements used in connection with my invention, and;

Fig. 6 is a perspective view of one of the resilient elements used in effectively maintaining the separate thermostatically controlled units in sealed assemblage.

Figure 2:
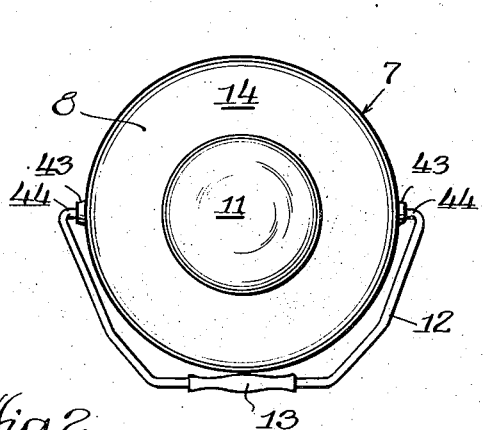
Fig. 2 is a top view of the one shown in Fig. 1 with the exception that the handle has been rotated ninety degrees in order to more clearly elucidate the structural elements thereof.
Figure 3:
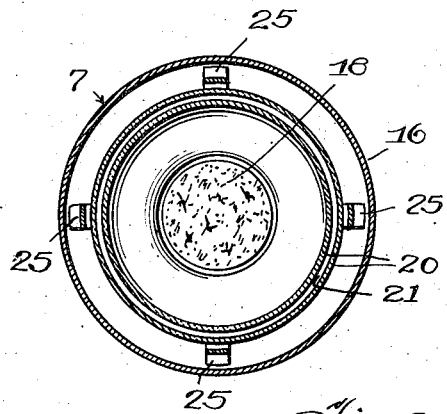
Fig. 3 is a transversal cross-sectional view taken, substantially, on the line 3—3 of Fig. 1.
Figure 1:
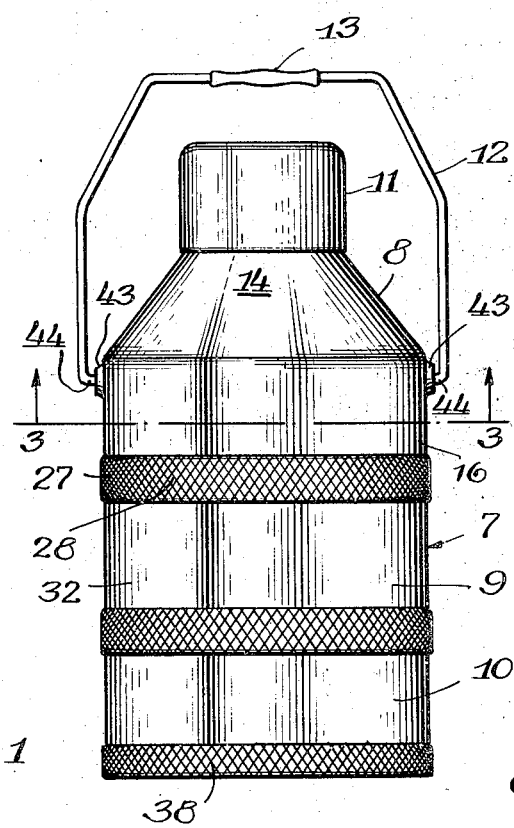
Fig. 1 is a front elevational view of my invention.

Referring to Fig. 1, it can be seen that my invention is, generally, designated 7, and is comprised of a liquid bottle-like or decanter-like structure 8, an intermediate structure 9, and a bottom structure 10. The entire arrangement is assembled together so that the said units or sections may be separated by structure which will be hereinafter more clearly elucidated. The bottle structure 8 is provided with a cover 11 which may be used as a cup for drinking purposes, and for consuming the liquids confined within the bottle structure 8. The entire unit is provided with a handle structure 12, having a gripping portion 13 to be grasped in the palm of the hand for carrying the same about as one would carry a lunch container, or other similar food containing structure.

The bottle container 8 consists of a conical portion 14, terminating in a mouth 15, which is suitably threaded in order to engage the threaded portion 19 of the cup element 11, thus completely enclosing the bottle-like structure 8 when not in use. The said structure 8 is also provided with a substantially cylindrical portion 16 contiguous to the aforementioned conical portion 14 and terminates in a threaded portion to be engaged by the adapter element 27 which is suitably knurled at 28 and is provided with a threaded portion 30 of lesser diameter, the threaded portions 29 and 30 being separated by a partition 31 which acts as the bottom support for the resilient structure comprised of the elements 22 and 23, riveted together by virtue of rivet 26 substantially at this point. Each spring leaf 22 and 23 is of a configuration to provide an arcuate portion 25 which will be confined against the interior of the cylindrical structures 16 or 32, whereas the terminus thereof is arcuately bent inwardly as indicated at 24 in order to provide a yieldable or resilient portion to confine the dual walled container 20 which is made of glass and which is substantially of shallower depth than the bottle like structure 8.

The dual wall structure 20 thus provides a pocket portion 21 from which the air is completely evacuated, whereas the outer portion of the container 20 and the inner portion thereof may be silvered and polished so as to reflect inwardly and retard the heat that may tend to be dissipated by conduction, whereas the outer reflecting surface on the outside of the container 20 tends to reflect and direct outwardly any heat which may tend to penetrate into the container. In other words, if heated liquid is stored within the cavity 40 then the heat will be maintained without losses due to convection, radiation or conduction, whereas the outer portion being polished will tend to reflect outwardly any heat rays which would attempt to penetrate the dual wall container 20 in the event cold liquids are placed in the confines 40, thus permitting the liquid contents within a container to be kept in the condition desired and in the original condition in which it was when placed within the confines 40.

The dual wall structure 20 is also held in place at the mouth 15 by means of a rubber gasket 17 so as to prevent the same from being jarred or damaged and thus provides suitable cushioning means therefor when the device is carried about so as to prevent breakage thereof. The opening in the dual wall container 20 is suitably sealed by a cork 18 which tends to confine the liquids placed therein against heat losses or heat gains from the surrounding atmosphere. The adapter element 27 serves ideally to secure the intermediate container 9 and the end container 10, the two being of similar construction and each being provided with a spring like structure consisting of spring leaves 22 and 23 as heretofore elucidated. However, the dual wall container 36 in this instance is more or less of a cylindrical and shallow configuration to resemble a plate structure in which such edibles as steaks, potatoes, roasts and other similar edibles may be confined, and eaten therefrom when the containers 9 and 10 are removed from their assemblage as shown.

The double walled units 36 are provided with a larger opening and hence require a cork structure 34 which has a tapered section so as to permit wedging the same into place, the spring leaves 22 and 23 urging the same upwardly together with the cork 34 abutting the bottom of the partition 31, thus providing a sealed compact unit to prevent heat losses or heat gains. The dual wall structure 36 is also provided with a pocket portion 37 from which the air has been evacuated, serving the purpose of a thermos construction which prevents losses by conduction, convection or radiation, insulating against heat rays entering or escaping.

The cork 34 may be suitably recessed as indicated at 35 in order to hold eating utensils such as a knife (not shown), a fork 46 and a spoon 47. As many units 9 may be combined in a construction as it is desired. However, the last unit 10 which is similar to the unit 9 has secured thereto a cap 38 which is also knurled to permit its ready removal and assemblage, having a threaded portion 39 which engages the thread at the terminus of the cylindrical section 10 and thus provides as in this instance a container which has a liquid compartment and two compartments for non-liquid foods. This construction may be modified so that only a liquid unit may be used in combination with a single non-liquid edible containing unit or the liquid unit 8 may be used itself, or with any number of units 9 and 10, the last unit being capped and enclosed by the closure or cap 38.

Thus in the compartment 40 liquid coffee, which is either hot or cold, may be stored. In the compartment 41 hot or cold meat and vegetables may be retained; whereas in the compartment 42 dessert, like preserves, fruits, ice cream and such other edibles, may be placed therein and confined in their original state in this container preventing losses of heat or absorption of heat from the surrounding atmosphere.

The lower units 9 and 10 are provided with an offset neck portion 33, and a rubber gasket 45, preferably of circular construction, so as to confine the double walled unit 36 from being jarred or moved about, or in other words to prevent vibration which might cause breakage thereof. The gasket 45 working in concert with the spring or resilient structure 22, 23, thus provides a very compact assemblage, which permits removability of parts and inspection thereof when that is desired or when repairs or replacements are needed. The entire structure is preferably provided with bosses or pads 43 which are suitably bored out in order to receive the trunnions 44 of the handle 12, so that the device may be conveniently carried about. The liquids may be spilled from the confines 40 into the confines of the cup 11 and so consumed. The other edibles may be eaten directly from the confines 41 or 42 within the units 9 and 10 respectively.

Although, I have herein shown and described rather succinctly the nature of the construction of my thermos container for holding or retaining in their original state liquid and non-liquid foods, and inasmuch as I believe that the same is susceptible of modifications and improvements, I hereby reserve the right to all modifications and improvements coming within the scope and spirit of my invention, as well as those embraced in the accompanying drawings, also those lying within the purview of the foregoing description.

Having thus described and disclosed my invention, what I claim as novel, and desire to secure by Letters Patent, is:

A thermal container for edibles comprising, a thermally controlled liquid retaining section, at least one thermally controlled non-liquid retaining section, an adapter element removably securing the said sections, a cap element secured removably to the bottom of the said non-liquid retaining section, each of the said sections being equipped with dual-walled vacuum containers therein, cork seal means removably secured to the tops of the openings of said containers, and resilient support means and lateral cushioning means secured intermediately the said dual-walled vacuum containers and the outer shells of said sections, the said cork seal means secured to the mouth of the said non-liquid retaining section having its upper portion recessed to accommodate eating implements.

EDGAR C. SMITH.